(12) United States Patent
Yoshimura et al.

(10) Patent No.: US 8,891,190 B1
(45) Date of Patent: Nov. 18, 2014

(54) ELECTRIC FIELD WRITING MAGNETIC STORAGE DEVICE

(71) Applicant: Akita University, Akita (JP)

(72) Inventors: Satoru Yoshimura, Akita (JP); Hitoshi Saito, Akita (JP)

(73) Assignee: Akita University, Akita (JP)

( * ) Notice: Subject to any disclaimer, the term of this patent is extended or adjusted under 35 U.S.C. 154(b) by 0 days.

(21) Appl. No.: 14/358,171

(22) PCT Filed: Oct. 31, 2012

(86) PCT No.: PCT/JP2012/078196
§ 371 (c)(1),
(2), (4) Date: May 14, 2014

(87) PCT Pub. No.: WO2013/073371
PCT Pub. Date: May 23, 2013

(30) Foreign Application Priority Data

Nov. 18, 2011 (JP) ................... 2011-253356

(51) Int. Cl.
*G11B 5/09* (2006.01)
*G11B 9/00* (2006.01)

(52) U.S. Cl.
CPC ....................... *G11B 5/09* (2013.01)
USPC ........................... 360/46; 369/126

(58) Field of Classification Search
None
See application file for complete search history.

(56) References Cited

U.S. PATENT DOCUMENTS

| | | | |
|---|---|---|---|
| 7,706,103 B2 | 4/2010 | Seigler | |
| 2004/0228024 A1* | 11/2004 | Ogawa et al. | 360/69 |
| 2005/0147018 A1* | 7/2005 | Kim et al. | 369/126 |
| 2006/0044661 A1* | 3/2006 | Ogawa et al. | 360/59 |
| 2006/0114606 A1* | 6/2006 | Ide | 360/125 |
| 2007/0230006 A1* | 10/2007 | Takahashi et al. | 360/55 |
| 2008/0068937 A1* | 3/2008 | Ogawa et al. | 369/13.17 |
| 2009/0196818 A1 | 8/2009 | Tokura et al. | |
| 2010/0128377 A1* | 5/2010 | Zhou et al. | 360/55 |
| 2014/0043712 A1* | 2/2014 | Yuan et al. | 360/125.31 |

FOREIGN PATENT DOCUMENTS

| | | |
|---|---|---|
| JP | 08-255707 A | 10/1996 |
| JP | 2006-065927 A | 3/2006 |
| JP | 2006-139854 A | 6/2006 |
| JP | 2008-034087 A | 2/2008 |
| WO | 2007/135817 A1 | 11/2007 |

OTHER PUBLICATIONS

Jia-Mian Hu, et al; "Magnetoelectric Responses in Multiferroic Composite Thin Filsm", Journal of Advanced Dielectrics, vol. 1, No. 1, pp. 1-16, Jan. 2011.
International Search Report mailed Mar. 5, 2013; PCT/JP2012/078196.

* cited by examiner

Primary Examiner — Thang Tran
(74) Attorney, Agent, or Firm — Ladas & Parry LLP

(57) ABSTRACT

An electric field writing magnetic storage device including: a rotatable disk including a substrate and a magnetic recording film provided on a surface of the substrate, the magnetic recording film including at least one ferromagnetic and ferroelectric layer; a writing device writing information into the magnetic recording film by means of an electric field, the writing device including a writing electrode generating a dielectric flux between the writing electrode and the substrate by having electric potential to the substrate; and a writing circuit choosing one electric potential among plurality of electric potential level and applying the chosen one electric potential to the writing electrode in every operation of writing information, wherein the dielectric flux generated according to the electric potential applied to the writing electrode by the writing circuit magnetizes the ferromagnetic and ferroelectric layer in a specific direction.

11 Claims, 9 Drawing Sheets

ELECTRIC FIELD WRITING MAGNETIC STORAGE DEVICE

TECHNICAL FIELD

The present invention relates to a magnetic recording technique using a rotatable disk including a substrate and a magnetic recording film provided on a surface of the substrate, the magnetic recording film including at least one ferromagnetic and ferroelectric layer. The present invention also relates to an electric field writing magnetic storage device generating a dielectric flux between a writing device and the substrate by means of the writing device, and magnetizing a part of the ferromagnetic and ferroelectric layer where the dielectric flux is applied in a specific direction in every operation of writing information, by means of the dielectric flux.

BACKGROUND ART

A conventional hard disc device that is a magnetic recording device applies a magnetic flux from a magnetic flux generating coil. The conventional hard disc device writes information to a rotatable disk which has a ferromagnetic film formed on a surface of a substrate of the device, by magnetizing a part where the magnetic flux is applied with a magnetic polarity of N or S.

CITATION LIST

Patent Literatures

Patent Document 1: Japanese Patent Application Laid-Open Publication No. 2008-034087

SUMMARY OF THE INVENTION

Problems to be Solved by the Invention

Disadvantageously, since the conventional hard disk device writes information by means of the magnetic flux, its power consumption in writing information is very large because of resistance of a coil of its write head and the like.

Also, when writing information, fast control of the current applied to the coil is necessary. High density recording needs to change the magnetization polarity of the coil core very frequently, but naturally the speed of polarity reversal has its limitations.

The maximum magnetic flux density generated from the coil depends on a saturation magnetic flux density of the material of the coil core. For this reason, even though Fe—Co which generates a largest magnetic flux is used, the maximum magnetic flux is around 2.4 T (tesla). Therefore, as long as a conventional coil is used, it is impossible to magnetize a magnetic recording film having an extremely high coercivity capable of ultra high density recording with a magnetic polarity of N or S (it is impossible to write information).

Also, the writing head of the conventional hard disk device has a complicated structure including a tiny coil, coil core and the like, which increases manufacturing costs. In addition, a magnetic recording medium includes a large amount of noble metal element, which also increases manufacturing costs.

And also, there is another drawback that a current magnetic recording medium requires manufacturing facilities of a huge scale, because of its thick multilayer structure.

Also, it is not guaranteed at present that the noble metal element used for the magnetic recording medium of the conventional hard disk is stably supplied.

Therefore, with the conventional hard disk device, it is not easy to reduce power consumption fundamentally, write information very fast, record information with a very high density, and lower its price. Also, the conventional hard disk device cannnot avoid the manufacturing facilities of the magnetic recording medium from being huge, and has limitations in stable supply of the magnetic recording medium.

JP 2008-034087 A employs a multiferroic material for a layer of a magnetic recording material layer consisting of a plurality of layers, and applies an electric field to the magnetic recording material when writing data. This makes it possible to reduce the out-of-plane magnetic anisotropy of the magnetic recording material and to easily reverse the magnetization by applying a magnetic flux. Therefore it can increase capacity of the magnetic data storage device.

In common with the present invention, JP 2008-034087 A employs a multiferroic material. However, since JP 2008-034087 A writes data by means of a magnetic coil, it does not have a direct relationship with the present invention.

An object of the present invention is to provide an electric field writing magnetic storage device generating a dielectric flux between a writing device and the substrate by means of the writing device, and magnetizing a part of the ferromagnetic and ferroelectric layer formed on the substrate in a specific direction in every operation of writing information, by means of the dielectric flux.

Another object of the present invention is to make it possible to fundamentally reduce power consumption, write information very fast, record information with very high density, and lower price of the magnetic recording device, and to make it possible to avoid the manufacturing facilities of the magnetic recording medium from becoming huge and stably supply the magnetic recording medium.

Means for Solving the Problems

The electric field writing magnetic storage device of the present invention includes the following embodiments.

[1]

An electric field writing magnetic storage device comprising:

a rotatable disk comprising a substrate and a magnetic recording film provided on a surface of the substrate, the magnetic recording film comprising at least one ferromagnetic and ferroelectric layer;

a writing device writing information into the magnetic recording film by means of an electric field, the writing device comprising a writing electrode, the writing electrode generating a dielectric flux between the writing electrode and the substrate by having electric potential to the substrate; and a writing circuit choosing one electric potential among plurality of electric potential level and applying the chosen one electric potential to the writing electrode in every operation of writing information, wherein the dielectric flux generated according to the electric potential applied to the writing electrode by the writing circuit magnetizes the ferromagnetic and ferroelectric layer in a specific direction.

The writing circuit can be configured so as to choose one electric potential from two electric potential levels and apply the chosen one electric potential to the writing electrode. In this case, as explicitly shown in [6], the writing circuit can apply the two electric potential levels (writing electric potential levels) of $V_1$ and $V_2$ to the writing electrode in every operation of writing information. The two electric levels are typically $V_2 > 0 > V_1$, but they may be $V_2 > V_1 > 0$ or $0 > V_2 > V_1$.

Also, the writing circuit can choose one electric potential among three or more of electric potential levels and apply the chosen one electric potential to the writing electrode. For example, the writing circuit can apply four electric potential levels (writing electric potential levels) of $V_{+2}$, $V_{+1}$, $V_{-1}$ and $V_{-2}$ ($V_{+2}>V_{+1}>0>V_{-1}>V_{-2}$) to the writing electrode. When the electric potential $V_{+2}$ is chosen, the writing circuit magnetizes the ferromagnetic and ferroelectric layer with a large magnetization $M_{M+}$ to the positive direction (+ direction), and when the electric potential level $V_{+1}$ is chosen, the writing circuit magnetizes the ferromagnetic and ferroelectric layer with a small magnetization $M_{m+}$ to the positive direction (+ direction). Also, when the electric potential level $V_{-1}$ is chosen, the writing circuit magnetizes the ferromagnetic and ferroelectric layer with a small magnetization $M_{m-}$ to the negative direction (− direction), and when the electric potential level $V_{-2}$ is chosen, the writing circuit magnetizes the ferromagnetic and ferroelectric layer with a large magnetization $M_{m-}$ to the negative direction (− direction). In this manner, information is written to the ferromagnetic and ferroelectric layer.

In this example, cases where the direction of magnetization is parallel (in the same direction) to the direction of the electric field caused by the electric potential is explained. However, the direction of magnetization may be antiparallel (in the opposite direction) to the direction of the electric field caused by the electric potential.

The ferromagnetic and ferroelectric layer is a so-called multiferroic layer. The "specific direction" in which the ferromagnetic and ferroelectric layer is magnetized by means of the dielectric flux is, typically, either one of two directions that are perpendicular to the surface of the substrate. However, it may be a direction parallel to the surface or a tilted direction to the surface. That is, the magnetization can be parallel to the substrate, or can have a parallel component to the substrate. As will be described in [9], the electric field writing magnetic storage device of the present invention can have a reading device reading the magnetization of the magnetic recording film, and the reading device can read the magnetization in the "specific direction" of the magnetic recording film.

Any substance can be employed as the ferromagnetic and ferroelectric layer as long as the magnetization of the substance can be changed by means of an electric field applied to the substance.

For example, as the ferromagnetic and ferroelectric layer, a ferromagnetic and ferroelectric substance consisting of a single layer, the substance whose magnetization can be changed by means of an electric field may be employed, and a laminate including a ferromagnetic material layer and a ferroelectric layer may also be employed. However, when the laminate including a ferromagnetic material layer and a ferroelectric layer is employed as the ferromagnetic and ferroelectric layer, the recording speed may significantly decrease. For such a reason, the ferromagnetic and ferroelectric substance, whose magnetization can be changed by means of an electric field even when it is a single layer, is preferably employed.

As a material for constituting the ferromagnetic and ferroelectric layer, for example, a ferromagnetic and ferroelectric substance represented by the following Formula (1) can be employed.

(1)

In Formula (1), A and B are independently an element selected from the group consisting of Bi, La, Tb, Pb, Y, Cr, Co, Ba, Lu, Yb and Eu;

M and N are independently an element selected from the group consisting of Fe, Mn, Ni, Ti, Cr, Co and V;

x is a real number of 0 to 1;

y is a real number of 0 to 1;

l is an integer of 1 to 3;

m is an integer of 1 to 3; and n is an integer of 3 to 6.

Specifically, as a known ferromagnetic and ferroelectric material whose magnetization can be changed by means of an electric field, $BiMnO_3$, $TbMnO_3$, $TbMn_2O_5$, $YMnO_3$, $EuTiO_3$, $CoCr_2O_4$, $Cr_2O_3$, $BiMn_{0.5}Ni_{0.5}O_3$, $BiFe_{0.5}Cr_{0.5}O_3$, $La_{0.1}Bi_{0.9}MnO_3$ $La_{1-x}Bi_xNi_{0.5}Mn_{0.5}O_3$, $Bi_{1-x}Ba_xFeO_3$ or the like may be employed.

[2]

The electric field writing magnetic storage device according to [1], either (A) the substrate comprising an electroconductive base substrate;

or (B) the substrate comprising an insulating or semiconducting base substrate and an electroconductive layer provided between the base substrate and the magnetic recording film.

Examples of electroconductive materials used for the electroconductive base substrate include metals such as aluminum can be exemplified.

Also, examples of insulating materials used for the insulating base substrate include glass, and examples of semiconducting materials used for the semiconducting base substrate include silicon.

[3]

The electric field writing magnetic storage device according to [1] or [2], the magnetic recording film comprising at least one electroconductive dielectric flux diffusion suppressing layer which suppresses diffusion of the dielectric flux.

Usually, a protective film (for example, a protective film consisting of a diamond-like carbon) is formed on a surface of the rotatable disk, and the magnetic recording film is protected by the protective film.

Note that the present invention does not exclude embodiments where the protective film functions as the electroconductive dielectric flux diffusion suppressing layer.

[4]

The electric field writing magnetic storage device according to [1] or [2], the magnetic recording film comprising at least one electroconductive or insulating ferromagnetic layer.

The ferromagnetic layer works as an assistance for reading the magnetization information from the ferromagnetic and ferroelectric layer, and the ferromagnetic layer can prevent vanishing of the magnetic information recorded on the ferromagnetic and ferroelectric layer.

In a case where the ferromagnetic layer is electrically conductive, the ferromagnetic layer can also function as the electroconductive dielectric flux diffusion suppressing layer. Conversely, in a case where the electroconductive dielectric flux diffusion suppressing layer consists of the ferromagnetic layer, the electroconductive dielectric flux diffusion suppressing layer can also function as the ferromagnetic layer (i.e. works as an assistance for reading the magnetization information from the ferromagnetic and ferroelectric layer and prevents vanishing of the magnetic information recorded on the ferromagnetic and ferroelectric layer).

[5]
The electric field writing magnetic storage device according to [1] or [2], either (X) the magnetic recording film comprising the single ferromagnetic and ferroelectric layer, at least one electroconductive dielectric flux diffusion suppressing layer which suppresses diffusion of the dielectric flux, and at least one electroconductive or insulating ferromagnetic layer;

or (Y) the magnetic recording film comprising plurality of the ferromagnetic and ferroelectric layer, at least one electroconductive dielectric flux diffusion suppressing layer which suppresses diffusion of the dielectric flux, and at least one electroconductive or insulating ferromagnetic layer.

[6]
The electric field writing magnetic storage device according to any one of [1] to [5], wherein the writing circuit applies either one electric potential of two positive and negative electric potential levels to the writing device in every writing operation.

[7]
The electric field writing magnetic storage device according to any one of [1] to [5], the writing device comprising plurality of the writing electrode, wherein the writing circuit applies any one electric potential of plurality of electric potential level to each of the plurality of writing electrode of the writing device in every writing operation.

[7]
The electric field writing magnetic storage device according to any one of [1] to [5], wherein the electric field writing magnetic storage device is configured so that that the writing device can move over the surface of the rotatable disk in a radial direction of the rotatable disk.

[9]
The electric field writing magnetic storage device according to any one of [1] to [8], further comprising:

a reading device reading the magnetization state of the magnetic recording film.

The term "magnetization state of the magnetic recording film" typically means a "magnetization direction of the magnetic recording film" and/or a "magnetization strength of the magnetic recording film".

The reading device can read the magnetization state kept in the magnetic recording film as information.

Effects of the Invention

In the present invention, writing is carried out virtually by means of an electric field. This results in extremely small power consumption in writing information.

Also, since the writing device does not have a coil (in other words, since it does not have inductance and it has a simple structure), it is possible to realize very fast writing and very high recording density.

Further, in the present invention, the number of layers of the recording medium can be reduced and the total film thickness can be reduced, which makes it possible to reduce the scale of the recording medium manufacturing facilities to about half. In addition, since few noble metal elements are used for the recording medium, it is possible to supply the recording medium stably at low cost.

BRIEF DESCRIPTION OF THE DRAWINGS

FIG. 1 includes figures to explain an electric field writing magnetic storage device of the present invention.

FIG. 2 includes figures to explain features of the electric field writing magnetic storage device of the present invention.

FIG. 4 includes figures to show embodiments of the electric field writing magnetic storage device of the present invention including a magnetic recording film consisting of a ferromagnetic and ferroelectric layer.

FIG. 5 includes figures to show embodiments of the electric field writing magnetic storage device of the present invention including a magnetic recording film consisting of a ferromagnetic and ferroelectric layer and a dielectric flux diffusion suppressing layer.

FIG. 6 includes figures to show embodiments of the electric field writing magnetic storage device of the present invention including a magnetic recording film consisting of a ferromagnetic and ferroelectric layer and an insulating ferromagnetic layer.

FIG. 7 includes figures to show embodiments of the electric field writing magnetic storage device of the present invention including a magnetic recording film consisting of a ferromagnetic and ferroelectric layer and an electroconductive ferromagnetic layer.

FIG. 8 includes figures to show embodiments of the electric field writing magnetic storage device of the present invention including a magnetic recording film consisting of a ferromagnetic and ferroelectric layer, an insulating ferromagnetic layer and an electroconducitve ferromagnetic layer.

FIG. 9 includes figures to show embodiments of the electric field writing magnetic storage device of the present invention including a magnetic recording film consisting of two ferromagnetic and ferroelectric layers and two electroconductive ferromagnetic layers.

MODES FOR CARRYING OUT THE INVENTION

Figure 1A:
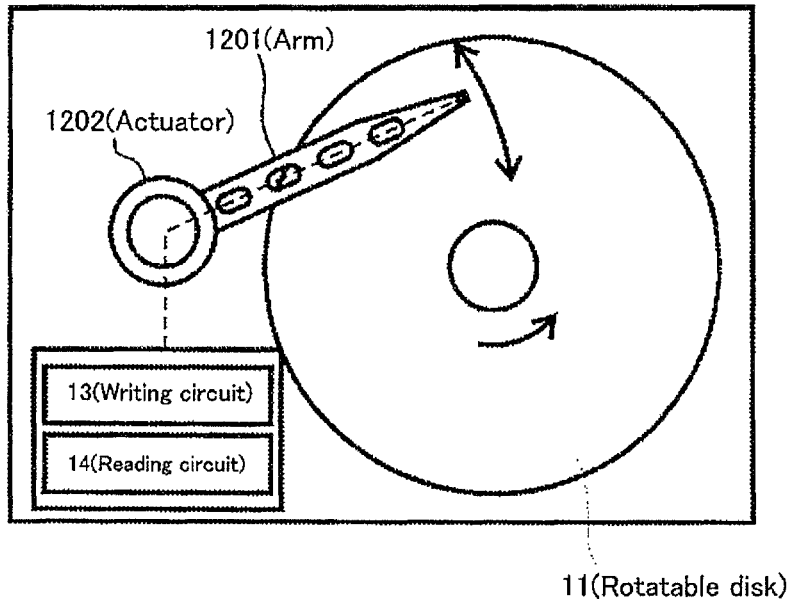
FIG. 1A is a plan view and FIG. 1B is a side view.
Figure 1B:
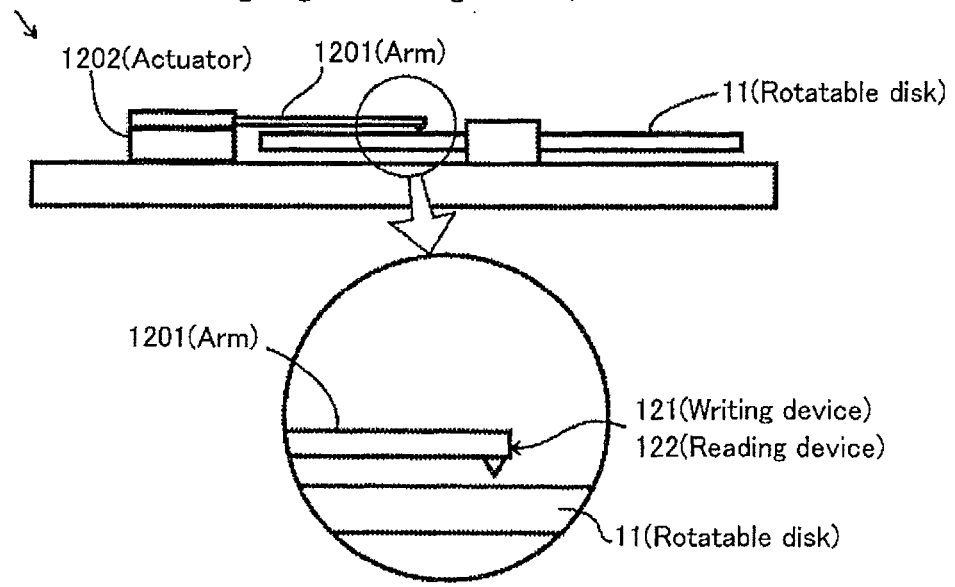

FIG. 1 includes figures to show an electric field writing magnetic storage device of the present invention; FIG. 1A is a plan view and FIG. 1B is a side view.

An actual electric field writing magnetic storage device is provided with a plurality of disks disposed at intervals, the disks each having a magnetic film formed on both sides thereof. An arm provided with a writing device and a reading device on its tip is disposed to the both sides of each of the discs.

An electric field writing magnetic storage device 1 in FIG. 1 is shown simplified for explanation, having a single rotatable disk, and a magnetic recording film is formed on only one side of the rotatable disk.

The electric field writing magnetic storage device 1 includes a rotatable disk 11, an arm 1201 provided with a writing device 121 and a reading device 122 on its tip (these are not shown in FIG. 1A), a writing circuit 13 (not shown in FIG. 1B) applying a signal for writing information to the writing device 121, and a reading circuit 14 (not shown in FIG. 1B) reading information written on the rotatable disk 11 via the reading device 122.

In FIG. 1, a magnetic recording film described later (see 112 in FIGS. 4 to 9) is formed on a surface of the rotatable disk 11.

The arm 1201 is rotated by means of an actuator 1202. This makes it possible for the writing device 121 and the reading device 122 to move over the surface of the rotatable disk in a radial direction of the rotatable disk.

Configurations of the writing device 121 and the reading device 122 provided to a tip of the actuator 1202 will be described later (see FIG. 2).

The writing circuit 13 operates the writing device 121, and the reading circuit 14 operates the reading device 122.

Figure 2A:
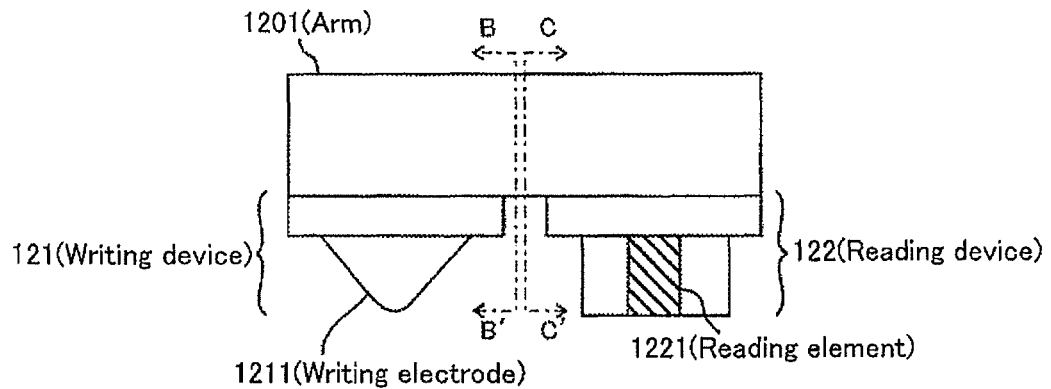
FIG. 2A is a schematic view illustrating a tip of an arm seen from the front.
Figure 2B:
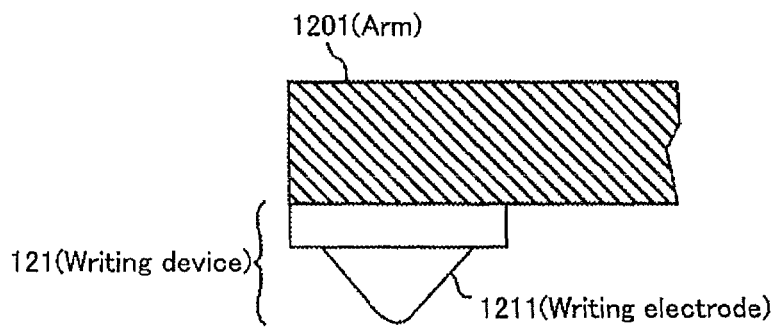
FIG. 2B is a B-B' cross-sectional view of FIG. 2A seen in the direction of the arrows (the view showing a writing electrode)
Figure 2C:
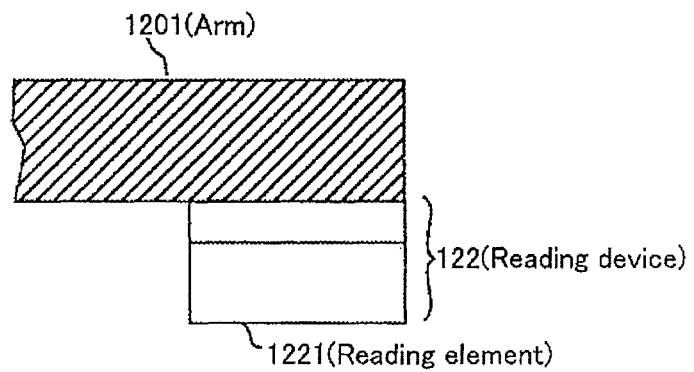
FIG. 2C is a C-C' cross-sectional view of FIG. 2A seen in the direction of the arrows.

A technical feature of the electric field writing magnetic storage device 1 of FIGS. 1A and 1B is shown in FIGS. 2A, 2B and 2C. FIG. 2A is a schematic view to show the tip of the arm 1201 seen from the front, FIG. 2B is a B-B' cross-sectional view in FIG. 2A seen in the direction of the arrows, and FIG. 2C is a C-C' cross-sectional view in FIG. 2A seen in the direction of the arrows.

The writing circuit 13 in FIG. 1 sends a writing signal to the writing device 121. An electric potential of positive or negative polarity occurs in a writing electrode (1211 in FIGS. 4 to 9) of the writing device 121 shown in FIG. 2A, and magnetic information (typically, bit information of N or S) is written into the magnetic recording film on the surface of the rotatable disk 11.

A reading element 1221 of the reading device 122 shown in FIG. 2A reads the magnetic information (typically bit information of N or S) written in the magnetic recording film on the surface of the rotatable disk 11, and sends the information to the reading circuit 14 in FIG. 1.

In a conventional electric field writing magnetic storage device, its writing head consists of a coil and a coil core. Therefore it has been impossible to provide a plurality of pairs of coil and coil core to one writing head adjacent to one another.

Figure 3A:
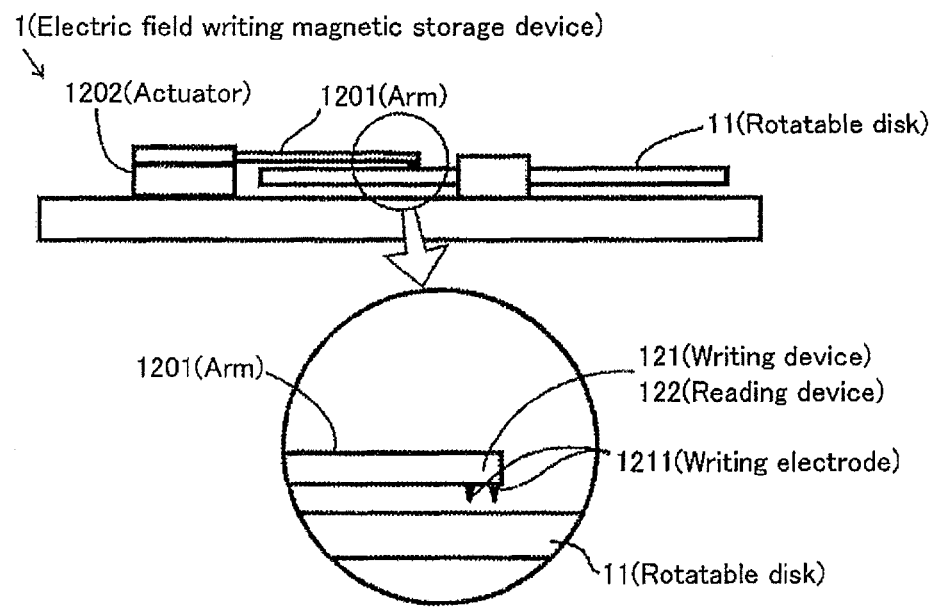
FIG. 3A is a figure to show an example in which a plurality of writing electrodes are formed in a writing device adjacent to one another.

On the other hand, since the writing device 121 of the electric field writing magnetic storage device 1 has a simple structure, it is possible to provide two or more of writing electrodes 1211 to the writing device 121 adjacent to one another as shown in FIG. 3A.

Figure 3B:
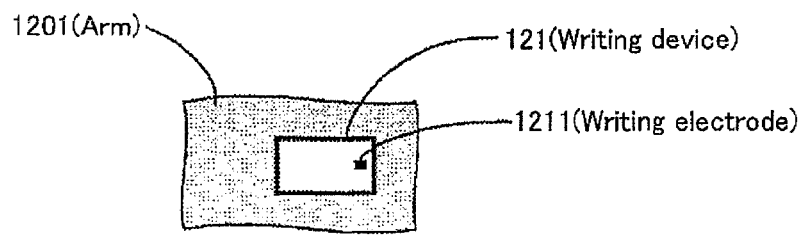
FIG. 3B is a figure to show an example in which one writing electrode is formed so as not to project.
Figure 3C:
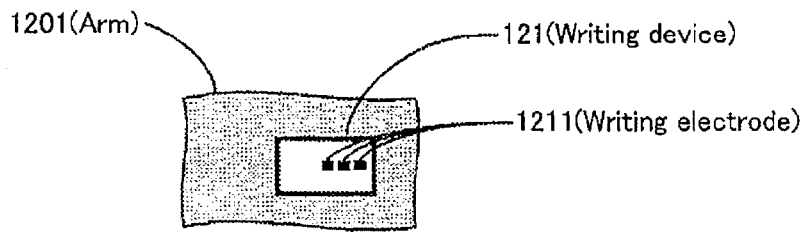
FIG. 3C is a figure to show an example in which a plurality of writing electrodes are formed so as not to project.

It is also possible to configure the writing electrode 1211 formed on the writing device 121 so that they do not project as shown in FIGS. 3B and 3C. FIG. 3B shows an example where one writing electrode is provided, and FIG. 3C shows an example where two or more writing electrodes are provided.

Hereinafter, a configuration of the electric field writing magnetic storage device 1 (mainly a configuration related to its writing operation) will be described in detail. In the following explanation as well, a base substrate 111, a magnetic recording film 112, the writing device 121 and the like are schematically shown, and shapes, sizes and the like thereof in figures do not reflect their actual shapes, sizes and the like. Also, for the sake of convenience, examples where the writing electrode 1211 has a positive electric potential to the base substrate 111 are explained.

Further, although an actual magnetic recording film 112 has a protective film such as diamond-like carbon on its surface, the explanation of the protective film is omitted in the following explanation.

Figure 4A:
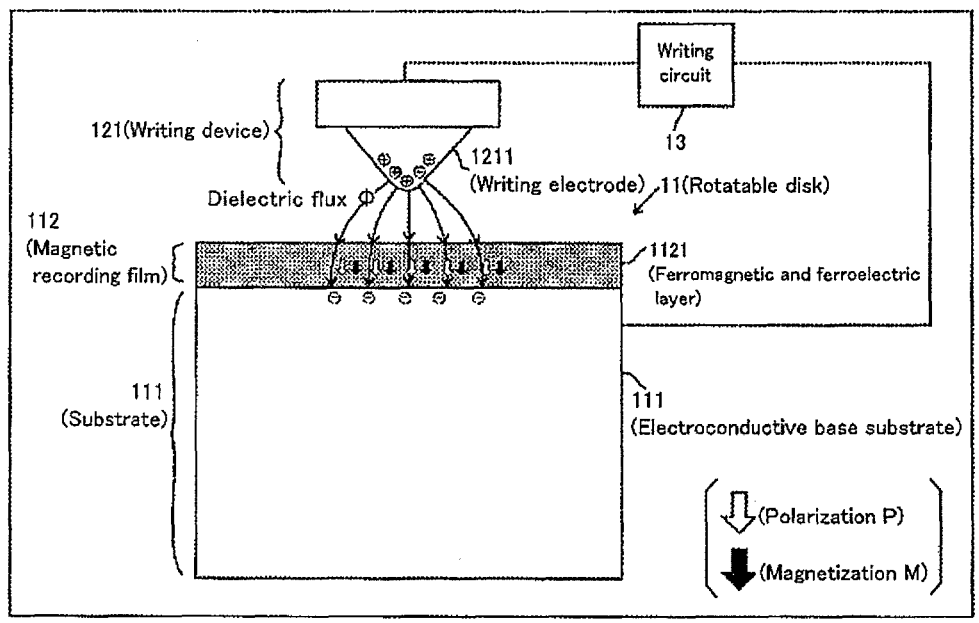
FIG. 4A shows an embodiment where the substrate includes an electroconductive base substrate.
Figure 4B:
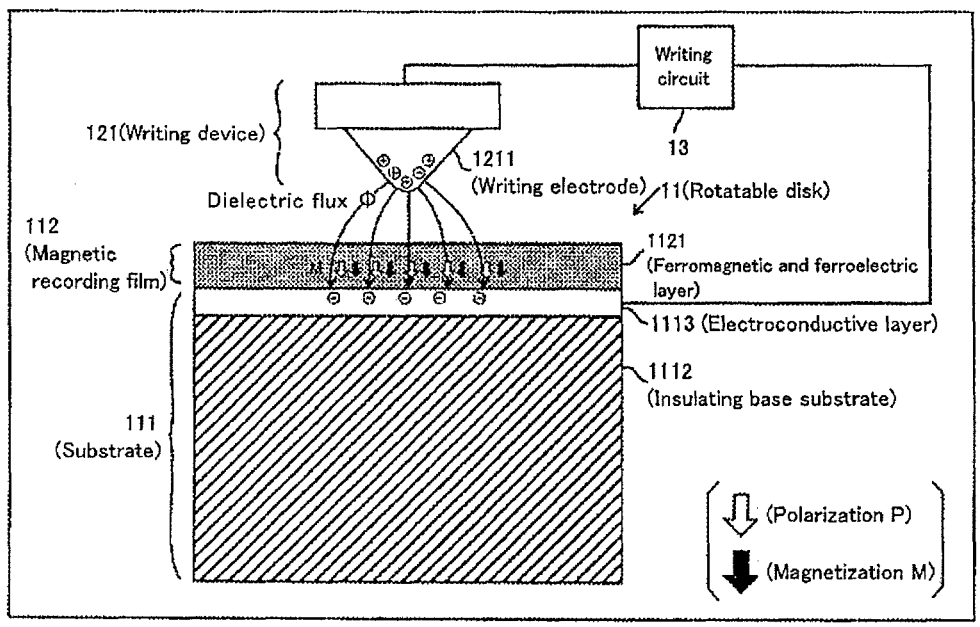
FIG. 4B shows an embodiment where the substrate includes an insulating base substrate.

FIG. 4 includes figures to show embodiments of the electric field writing magnetic storage device 1 including the magnetic recording film 112 consisting of a ferromagnetic and ferroelectric layer. FIG. 4A shows an embodiment where the substrate 111 includes an electroconductive base substrate. FIG. 4B shows an embodiment where the substrate 111 includes an insulating base substrate.

In FIG. 4 and FIGS. 5 to 8, recording magnetization is shown to be in the same direction as the direction of the written polarization, for the sake of easiness of explanation.

In an electric field writing magnetic storage device 1A in FIG. 4A, the base substrate 111 of the rotatable disk 11 consists of a base substrate 1111 made of an electroconductive material such as aluminum. The magnetic recording film 112 is formed on a surface of the substrate 111. The magnetic recording film 112 consists of a ferromagnetic and ferroelectric layer 1121.

As the ferromagnetic and ferroelectric layer 1121, any substance can be employed as long as the substance has ferromagnetic and ferroelectric property and magnetization of the substance can be changed by means of an electric field applied thereto.

For example, as the ferromagnetic and ferroelectric layer 1121, a single layer of a ferromagnetic and ferroelectric substance whose magnetization can be changed by an electric field may be employed, and a laminate including a ferromagnetic material layer and a ferroelectric material layer may also be employed. In this embodiment, (111)-oriented $(Bi_{1-x}Ba_x)(Fe_{1-y}Mn_y)O_3$ is used as the ferromagnetic and ferroelectric layer 1121.

As will be described later (see FIG. 9), the magnetic recording film 112 may include a plurality of ferromagnetic and ferroelectric layers 1121.

The writing device 121 has the writing electrode 1211, and the writing electrode 1211 can generate a dielectric flux Φ between the writing electrode 1211 and the substrate 111 by having an electric potential to the substrate 111.

The writing circuit 13 can apply either one of two electric potential levels of positive or negative electric potential to the writing electrode 1211 in every operation of writing information.

The dielectric flux Φ generated according to the electric potential applied to the writing electrode 1211 by the writing circuit 13 magnetizes the ferromagnetic and ferroelectric layer 1121 in a specific direction.

A polarization P occurs in the area where the dielectric flux Φ passes in a direction according to the direction of the dielectric flux Φ. With the polarization P, the area is magnetized in a direction according to the direction of the dielectric flux Φ (magnetization M).

The polarization P is shown by white arrows and the magnetization M is shown by black arrows.

State of the magnetization M described above is stored in the ferromagnetic and ferroelectric layer 1121, and therefore the state can be read by the reading device 122 (the reading element 1221) shown in FIGS. 2A and 2C.

Although the direction of the magnetization M is usually the same as the direction of the dielectric flux Φ (Φ has a positive direction or a negative direction), there may be a non-zero angle between the direction of the magnetization M and the direction perpendicular (i.e. the normal direction or the opposite direction to the normal direction) to the surface of the substrate 111 (i.e. the magnetization may trend in an in-plane direction of the surface of the substrate 111 or have a component in the in-plane direction).

The writing circuit 13 can apply four electric potential levels (writing electric potential levels) of $V_{+2}$, $V_{+1}$, $V_{-1}$ and $V_{-2}$ ($V_{+2}$>$V_{+1}$>0>$V_{-1}$>$V_{-2}$) to the writing electrode 1211. When the electric potential $V_{+2}$ is chosen, the writing circuit 13 magnetizes the magnetic recording film 112 with a large magnetization $M_{m+}$ in the positive direction (+ direction), and when the electric potential $V_{+1}$ is chosen, the writing circuit 13 magnetizes the magnetic recording film 112 with a small magnetization $M_{m+}$ in the positive direction (+ direction). Also, when the electric potential $V_{-1}$ is chosen, the writing circuit 13 magnetizes the magnetic recording film 112 with a small magnetization $M_{m-}$ in the negative direction (− direction), and when the electric potential $V_{-2}$ is chosen, the writing circuit 13 magnetizes the magnetic recording film 112 with a large magnetization $M_{M-}$ in the negative direction (− direction). Although examples where the direction of the electric field caused by the electric potential and the direction of magnetization are parallel to each other (i.e. in the same direction) have been explained, the direction of the electric field caused by the electric potential and the direction of magnetization may be antiparallel to each other (i.e. in opposite directions).

The base substrate 1111 of the substrate 111 is an electroconductive body in the electric field writing magnetic storage device 1A in FIG. 4A. On the other hand, a base substrate 1112 of the substrate 111 is an insulating body in the electric field writing magnetic storage device 1B in FIG. 4B. In this case, an electroconductive layer 1113 is provided between the magnetic recording film 112 and the base substrate 1112 consisting of an insulating body. For the insulating body used as the base substrate 1112, glass, ceramic, plastic and the like may be employed for example. Also, a semiconducting body such as silicon can be employed instead of the insulating body.

Figure 5C:
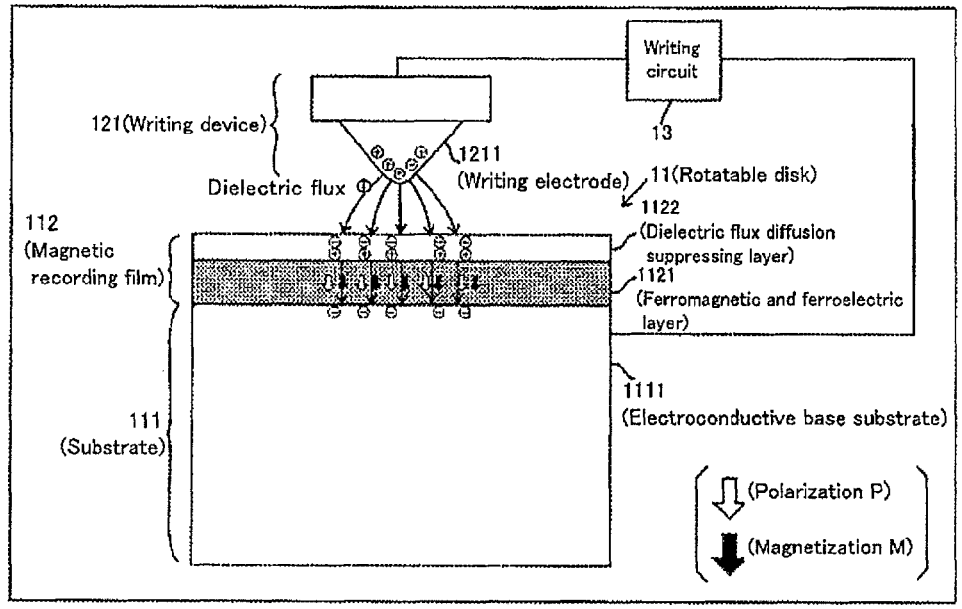
FIG. 5C shows an embodiment where the substrate includes an electroconductive base substrate.
Figure 5D:
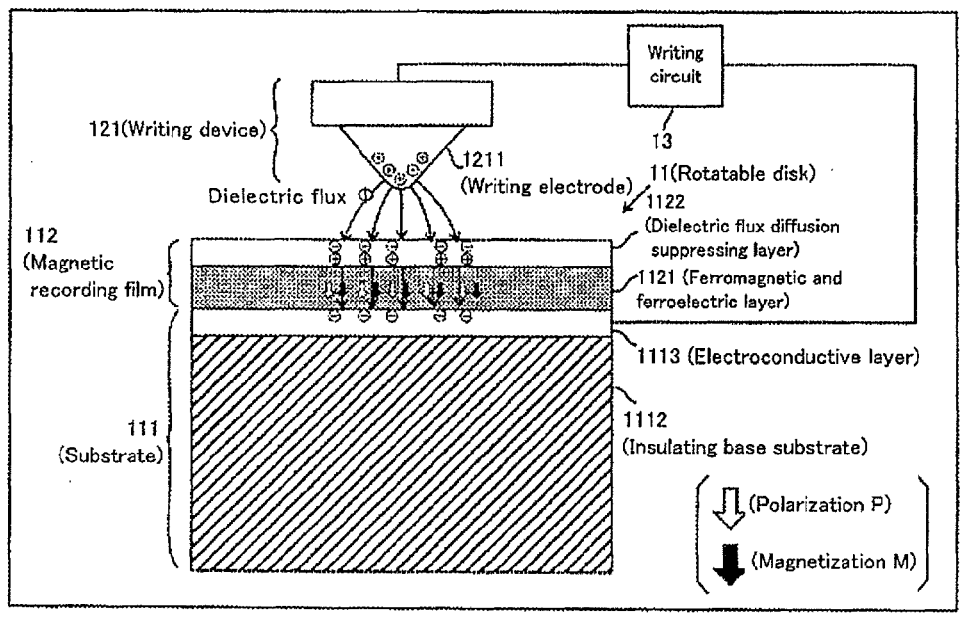
FIG. 5D shows an embodiment where the substrate includes an insulating base substrate.

In an electric field writing magnetic storage device 10 in FIG. 5C, the magnetic recording film 112 includes the ferromagnetic and ferroelectric layer 1121 and a dielectric flux diffusion suppressing layer 1122. That is, The dielectric flux diffusion suppressing layer 1122 is provided on the surface side of the magnetic recording film 112. The dielectric flux diffusion suppressing layer 1122 has an electrical conductivity. By providing an electroconductive layer on the surface side of the magnetic recording film 112, diffusion of the dielectric flux between the writing electrode 1211 and the magnetic recording film 112 is suppressed (the dielectric flux between the writing electrode 1211 and the magnetic recording film 112 is focused). This makes it possible to increase the writing density of the written information.

In the electric field writing magnetic storage device 10 in FIG. 5C, the base substrate 1111 of the substrate 111 is an electroconductive body. On the other hand, in the electric field writing magnetic storage device 1D in FIG. 5D, the base substrate 1112 of the substrate 111 is an insulating body. In this case, an electroconductive layer 1113 is provided between the magnetic recording film 112 and the base substrate 1112 consisting of an insulating body.

Figure 6E:
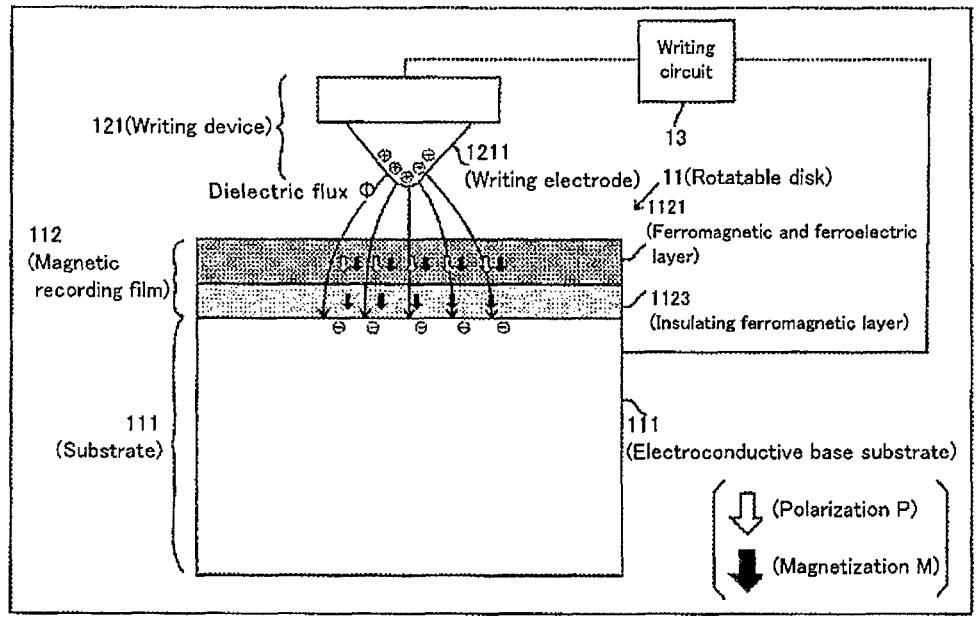
FIG. 6E shows an embodiment where the substrate includes an electroconductive base substrate.
Figure 6F:
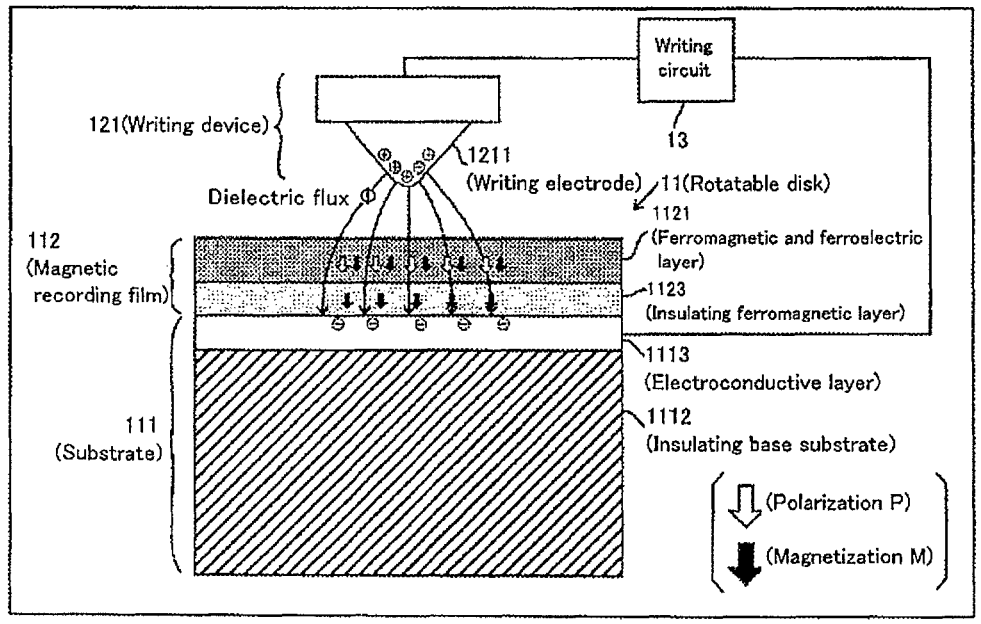
FIG. 6F shows an embodiment where the substrate includes an insulating base substrate.

In an electric field writing magnetic storage device 1E in FIG. 6E, the magnetic recording film 112 includes the ferromagnetic and ferroelectric layer 1121 and an insulating ferromagnetic layer 1123. That is, the insulating ferromagnetic layer 1123 is provided on the side of the substrate 111 of the magnetic recording film 112. The insulating ferromagnetic layer 1123 is preferably in contact with the ferromagnetic and ferroelectric layer 1121 as shown in the figure. When the ferromagnetic and ferroelectric layer 1121 is magnetized by the writing electrode 1211, in accordance with the magnetization, the insulating ferromagnetic layer 1123 is also magnetized. The insulating ferromagnetic layer 1123 stabilizes the magnetization direction recorded in the magnetic recording film 112 and remarkably improves reading accuracy of the reading device 122 (see FIGS. 2A and 2C) reading the magnetization recorded in the magnetic recording film 112.

The insulating ferromagnetic layer 1123 may also be formed on the surface side of the magnetic recording film 112.

In the electric field writing magnetic storage device 1E, the base substrate 1111 of the substrate 111 is an electroconductive body. On the other hand, in an electric field writing magnetic storage device 1F, the base substrate 1112 of the substrate 111 is an insulating body. In this case, the electroconductive layer 1113 is provided between the magnetic recording film 112 and the substrate 1112 consisting of an insulating body. In this case as well, the insulating ferromagnetic layer 1123 may also be formed on the surface side of the magnetic recording film 112.

Figure 7G:
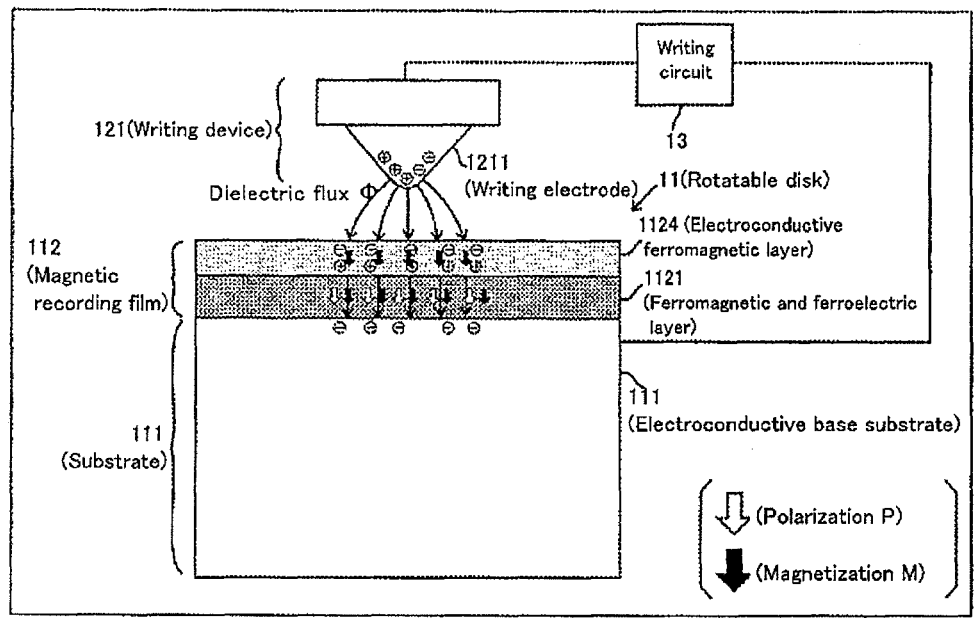
FIG. 7G shows an embodiment where the substrate includes an electroconductive base substrate.

In an electric field writing magnetic storage device 1G in FIG. 7G, the magnetic recording film 112 includes the ferromagnetic and ferroelectric layer 1121 and an electroconductive ferromagnetic layer 1124. That is, the electroconductive ferromagnetic layer 1124 is provided on the surface side of the magnetic recording film 112. The electroconductive ferromagnetic layer is preferably in contact with the ferromagnetic and ferroelectric layer 1121 as shown in the figure. When the ferromagnetic and ferroelectric layer 1121 is magnetized by the writing electrode 1211, in accordance with the magnetization, the electroconductive ferromagnetic layer 1124 is also magnetized. The electroconductive ferromagnetic layer 1124 stabilizes the magnetization direction recorded in the magnetic recording film 112 and remarkably improves the accuracy of the reading device 112 (see FIGS. 2A and 2C) reading magnetization recorded in the magnetic recording film 112.

In addition, in the electric field writing magnetic storage device 1G in FIG. 7G, the surface side of the magnetic recording film 112 is electroconductive (the electroconductive ferromagnetic layer 1124 is provided on the surface side). Therefore, diffusion of the dielectric flux between the writing electrode 1211 and the magnetic recording film 112 is suppressed in the same manner as in the electric field writing magnetic storage device 1C in FIG. 5C, which makes it possible to increase the writing density of the written information.

In the electric field writing magnetic storage device 1G in FIG. 7G, it is not intended to exclude a embodiment where the electroconductive ferromagnetic layer 1124 is provided on the side of the substrate 111 of the magnetic recording film 112.

In the electric field writing magnetic storage device 1G in FIG. 7G, the base substrate 1111 of the substrate 111 is an electroconductive body. On the other hand, in an electric field writing magnetic storage device 1H in FIG. 7H, the base substrate 1112 of the substrate 111 is an insulating body. In this case, the electroconductive layer 1113 is provided between the magnetic recording film 112 and the base substrate 1112 consisting of an insulating body.

Figure 7H:
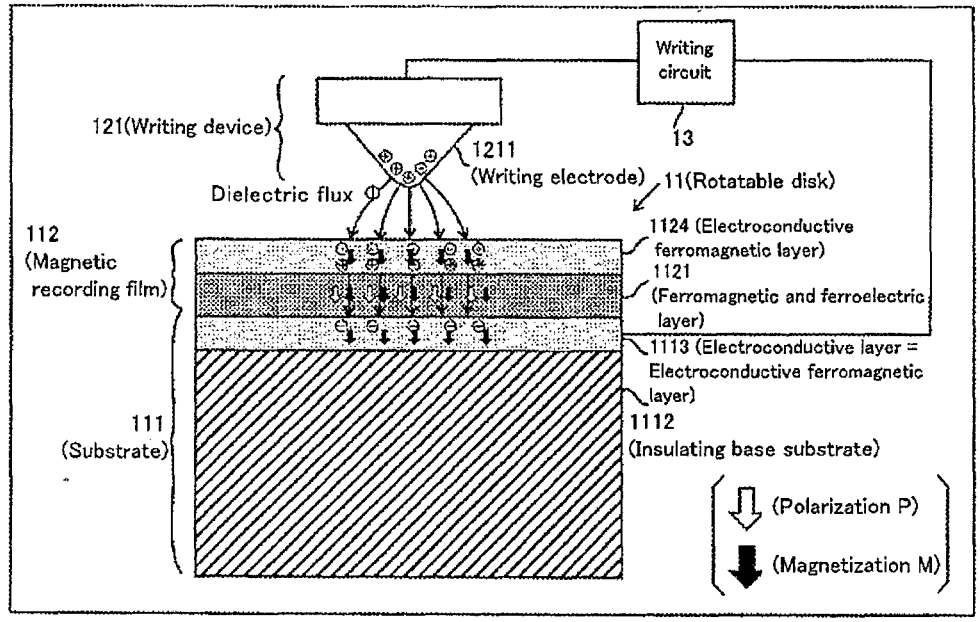
FIG. 7H shows an embodiment where the substrate includes an insulating base substrate.

In the electric field writing magnetic storage device 1H in FIG. 7H, the electroconductive layer 1113 is made of a magnetic material, but it is not intended to exclude an embodiment where the electroconductive layer 1113 is made of a non-magnetic material.

Figure 8I:
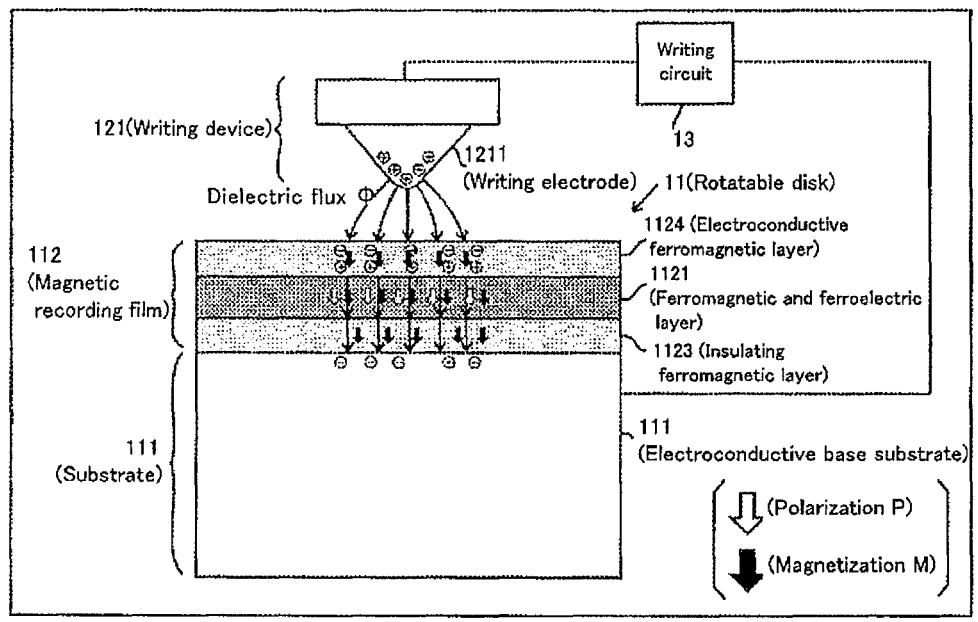
FIG. 8I shows an embodiment where the substrate includes an electroconductive base substrate.
Figure 8J:
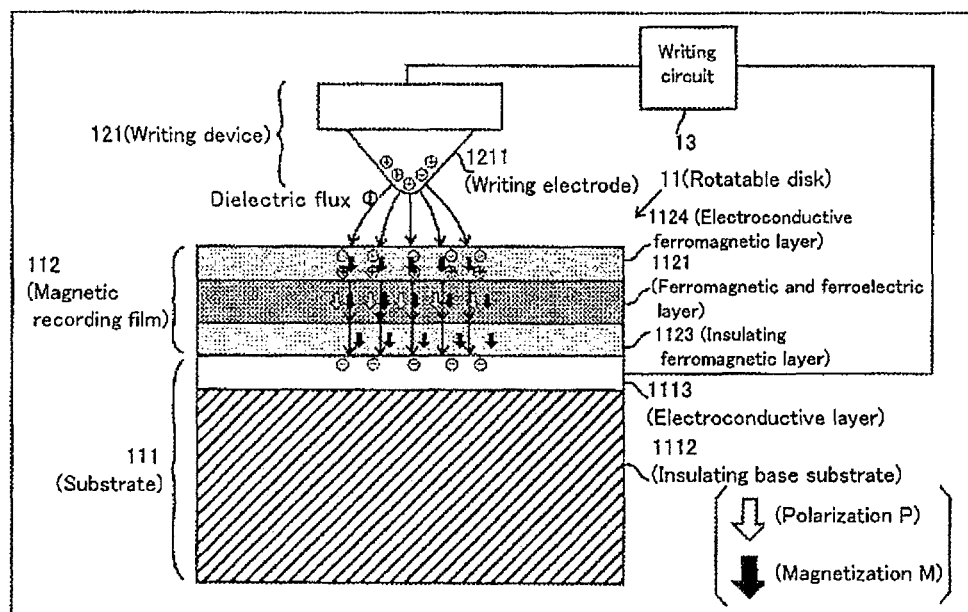
FIG. 8J shows an embodiment where the substrate includes an insulating base substrate.

In an electric field writing magnetic storage device 1I in FIG. 8I, the magnetic recording film 112 includes the ferromagnetic and ferroelectric layer 1121, the insulating ferromagnetic layer 1123 and the electroconductive ferromagnetic layer 1124. That is, the insulating ferromagnetic layer 1123 is provided on the side of the substrate 111 of the magnetic recording film 112, and the electroconductive ferromagnetic layer 1124 is provided on the surface side.

The electroconductive ferromagnetic layer 1124 contributes to suppressing diffusion of the dielectric flux between the writing electrode 1211 and the magnetic recording film 112 (focusing the dielectric flux between the writing electrode 1211 and the magnetic recording film 112), stabilizes the magnetization direction recorded in the magnetic recording film 112, and remarkably improves the reading accuracy of the reading device 122 (see FIGS. 2A and 2C) reading the magnetization recorded in the magnetic recording film 112.

In the electric field writing magnetic storage device 1I in FIG. 8I, it is not intended to exclude an embodiment where an electroconductive ferromagnetic layer is employed instead of the insulating ferromagnetic layer 1123.

In the electric field writing magnetic storage device 1I in FIG. 8I, the base substrate 1111 of the substrate 111 is an electroconductive body. On the other hand, in an electric field writing magnetic storage device 1J in FIG. 8J, the base substrate 1112 of the substrate 111 is an insulating body. In this case, the electroconductive layer 1113 is provided between the magnetic recording film 112 and the base substrate 1112 consisting of an insulating body.

Figure 9K:
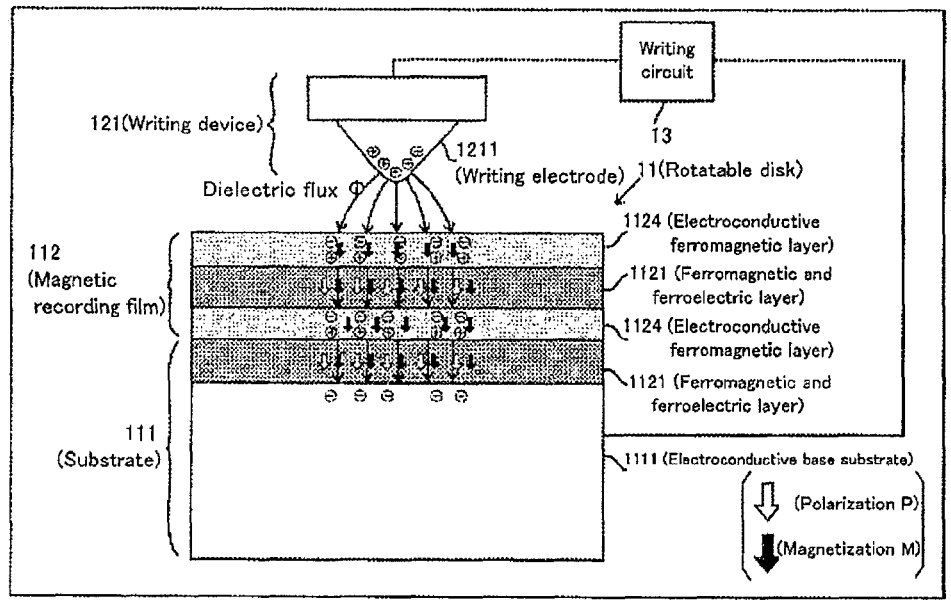
FIG. 9K shows an embodiment where the substrate includes an electroconductive base substrate.
Figure 9L:
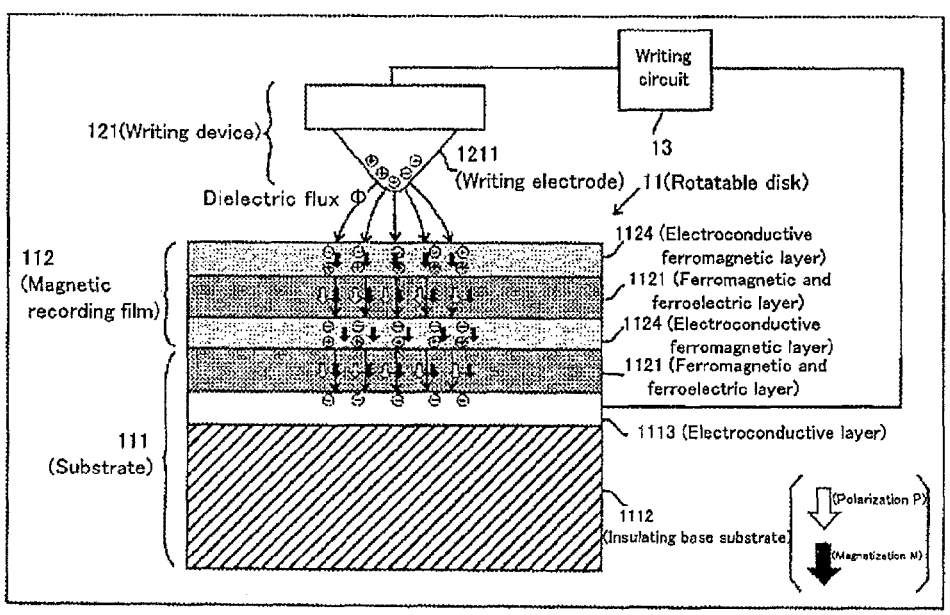
FIG. 9L shows an embodiment where the substrate includes an insulating base substrate.

In an electric field writing magnetic storage device 1K in FIG. 9K, the magnetic recording film 112 includes two ferromagnetic and ferroelectric layers 1121 and two electroconductive ferromagnetic layers 1124. That is, a first electroconductive ferromagnetic layer 1124 is provided on the surface side of the magnetic recording film 112, and a first ferromagnetic and ferroelectric layer 1121 is provided on the undersurface of the first electroconductive ferromagnetic layer 1124, further, a second electroconductive ferromagnetic layer 1124 is provided on the undersurface of the first ferromagnetic and ferroelectric layer 1121, and a second ferromagnetic and ferroelectric layer 1121 is provided on the undersurface of the second electroconductive ferromagnetic layer 1124.

The electroconductive ferromagnetic layers 1124 contribute to suppressing diffusion of the dielectric flux between the writing electrode 1211 and the magnetic recording film 112 (focusing the dielectric flux between the writing electrode 1211 and the magnetic recording film 112), stabilize the magnetization direction recorded in the magnetic recording film 112, and remarkably improve the reading accuracy of the reading device 112 (see FIGS. 2A and 2C) reading the magnetization recorded in the magnetic recording film 112.

In the electric field writing magnetic storage device 1K in FIG. 9K, the substrate body 1111 of the substrate 111 is an electroconductive body. On the other hand, in an electric field writing magnetic storage device 1L in FIG. 9L, the base substrate 1112 of the substrate 111 is an insulating body. In this case, the electroconductive layer 1113 is provided between the magnetic recording film 112 and the base substrate 1112 consisting of an insulating body.

DESCRIPTION OF THE REFERENCE NUMERALS 1, 1A to 1L, electric field writing magnetic storage device
11 rotatable disk
13 writing circuit
14 reading circuit
111 substrate
112 magnetic recording film
121 writing device
122 reading device
1111, 1112 base substrate
1113 electroconductive layer
1121 ferromagnetic and ferroelectric layer
1122 dielectric flux diffusion suppressing layer
1123 insulating ferromagnetic layer
1124 electroconductive ferromagnetic layer
1201 arm
1202 actuator
1211 writing electrode
1221 reading element
M magnetization
P polarization

The invention claimed is:

1. An electric field writing magnetic storage device comprising:
   a rotatable disk comprising a substrate and a magnetic recording film provided on a surface of the substrate, the magnetic recording film comprising at least one ferromagnetic and ferroelectric layer;
   a writing device writing information into the magnetic recording film by means of an electric field, the writing device comprising a writing electrode, the writing electrode generating a dielectric flux between the writing electrode and the substrate by having electric potential to the substrate; and
   a writing circuit choosing one electric potential among plurality of electric potential level and applying the chosen one electric potential to the writing electrode in every operation of writing information,
   wherein the dielectric flux generated according to the electric potential applied to the writing electrode by the writing circuit magnetizes the ferromagnetic and ferroelectric layer in a specific direction.

2. The electric field writing magnetic storage device according to claim 1,
   either (A) the substrate comprising an electroconductive base substrate;
   or (B) the substrate comprising an insulating or semiconducting base substrate and an electroconductive layer provided between the base substrate and the magnetic recording film.

3. The electric field writing magnetic storage device according to claim 1,
   the magnetic recording film comprising at least one electroconductive dielectric flux diffusion suppressing layer which suppresses diffusion of the dielectric flux.

4. The electric field writing magnetic storage device according to claim 1,
   the magnetic recording film comprising at least one electroconductive or insulating ferromagnetic layer.

5. The electric field writing magnetic storage device according to claim 1,
   either (X) the magnetic recording film comprising the single ferromagnetic and ferroelectric layer, at least one electroconductive dielectric flux diffusion suppressing lever which suppresses diffusion of the dielectric flux, and at least one electroconductive or insulating ferromagnetic layer;
   or (Y) the magnetic recording film plurality of the ferromagnetic and ferroelectric layer, at least one electroconductive dielectric flux diffusion suppressing layer which suppresses diffusion of the dielectric flux, and at least one electroconductive or insulating ferromagnetic layer.

6. The electric field writing magnetic storage device according to claim 1,
wherein the writing circuit applies either one electric potential of two positive and negative electric potential levels to the writing device in every writing operation.

7. The electric field writing magnetic storage device according to claim 1,
the writing device comprising plurality of the writing electrode,
wherein the writing circuit applies any one electric potential of plurality of electric potential level to each of the plurality of writing electrode of the writing device in every writing operation.

8. The electric field writing magnetic storage device according to claim 1,
wherein the electric field writing magnetic storage device is configured so that that the writing device can move over the surface of the rotatable disk in a radial direction of the rotatable disk.

9. The electric field writing magnetic storage device according to claim 1, further comprising:
a reading device reading the magnetization state of the magnetic recording film.

10. The electric field writing magnetic storage device according to claim 5,
the writing device comprising plurality of the writing electrode,
wherein the writing circuit applies any one electric potential of plurality of electric potential level to each of the plurality of writing electrode of the writing device in every writing operation.

11. The electric field writing magnetic storage device according to claim 2,
either (X) the magnetic recording film comprising the single ferromagnetic and ferroelectric layer, at least one electroconductive dielectric flux diffusion suppressing layer which suppresses diffusion of the dielectric flux, and at least one electroconductive or insulating ferromagnetic layer, or (Y) the magnetic recording film comprising plurality of the ferromagnetic and ferroelectric layer, at least one electroconductive dielectric flux diffusion suppressing layer which suppresses diffusion of the dielectric flux, and at least one electroconductive or insulating ferromagnetic layer; and
the writing device comprising plurality of the writing electrode,
wherein the writing circuit applies any one electric potential of plurality of electric potential level to each of the plurality of writing electrode of the writing device in every writing operation.

* * * * *